May 12, 1964    C. C. HOFFMAN    3,132,610
POTATO PLANTERS

Filed Oct. 15, 1962    2 Sheets-Sheet 1

INVENTOR.
CARL C. HOFFMAN
BY
ATTORNEY

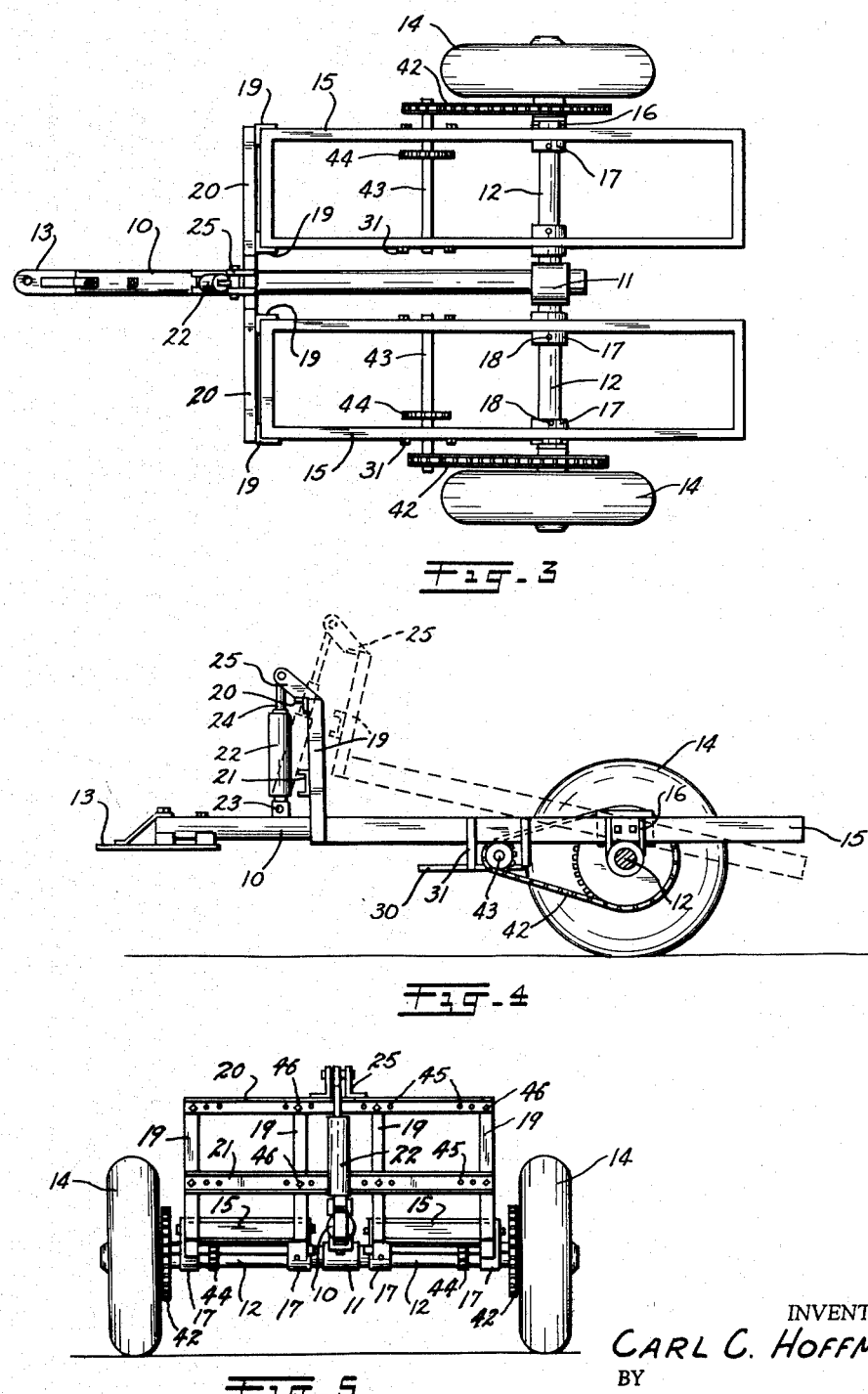

3,132,610
POTATO PLANTERS
Carl C. Hoffman, 28 Rupert St., Monte Vista, Colo.
Filed Oct. 15, 1962, Ser. No. 230,592
4 Claims. (Cl. 111—3)

This invention relates to a potato planter and more particularly to two row planters. One of the principal objections to conventional potato planters is the labor and time required to adjust the planter for various field conditions and for various planting depths. In the usual planter, the seed hoppers and the seed potato delivery mechanisms are mounted in a vertically fixed position. This requires tedious and individual adjustment of the planting shoes, the seed feed tubes, the furrow filling discs and all of the related elements when it is desired to change the planting depth or transport the planter between rows or fields.

The principal object of this invention is to provide a planter having permanent relative settings between the seed hoppers and the planting elements so arranged that the planting shoes and all of their related elements can be rapidly and simultaneously adjusted from the elevated transport position to the full depth planting position without manual effort and without disturbing the individual planting elements on their adjustments.

Since the seed hoppers and planting elements on present planters must be positioned relatively high to allow for vertical adjustment of the shoe, the seed potatoes must drop a relatively long distance to the furrow. This causes them to bounce and roll when they strike the bottom of the furrow resulting in uneven and non-uniform plant spacing along the rows.

Another object of the invention is to provide a planter having simultaneously movable planting elements so that the vertical distance between the seed delivery mechanism and the planting shoe can be maintained relatively short and uniform at all vertical settings so that the seed potatoes will come to rest without bouncing or rolling to maintain uniform plant spacing.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 3 is a detail view showing a top plan view of the frame of the planter as it would appear before the superstructure and planting elements are installed;

FIG. 4 is a side elevational view of the frame of FIG. 3 as it would appear with a near wheel removed; and FIG. 5 is a front view of the frame of FIGS. 3 and 4.

Figure 1:
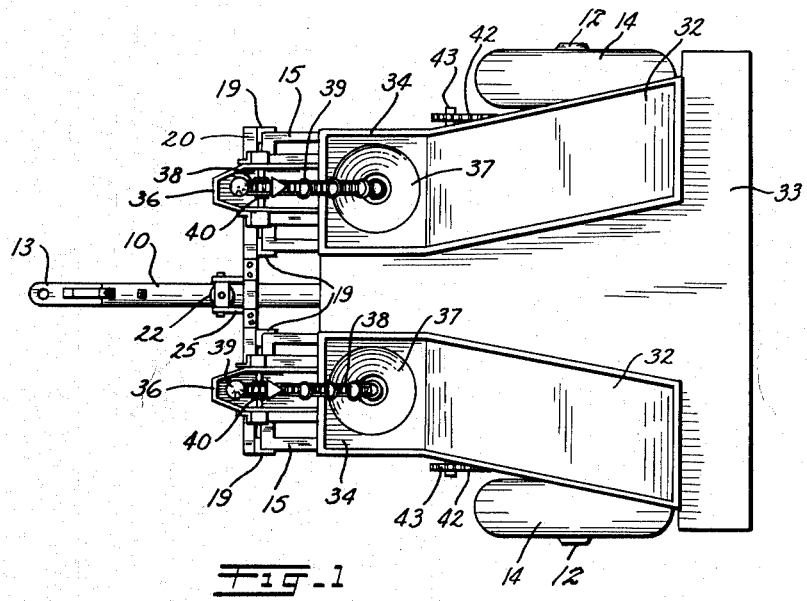
FIG. 1 is a top plan view of the improved planter.
Figure 2:
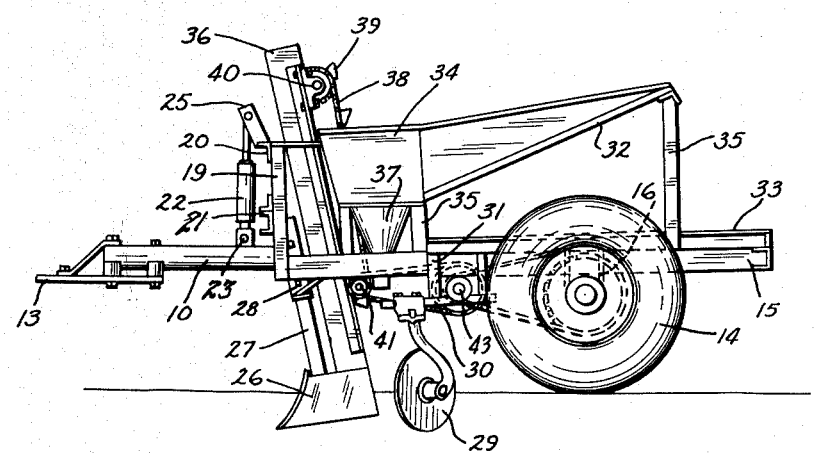
FIG. 2 is a left side elevational view thereof.

The seed delivering and planting mechanism, per se, may be any of the well known types such as the cupped chain or spike types. This invention relates more particularly to a supporting frame and mounting means for the seed delivering and planting mechanism.

The supporting frame employs a medial tongue 10 mounted at its rear extremity through the medium of any suitable mounting fixture 11 on the mid-point of a rear axle housing 12 in T-shape relation to the latter. The forward extremity of the tongue 10 is provided with a hitch element 13 by means of which it may be attached to the draw bar of a tractor or other towing vehicle. A pneumatically-tired, ground-engaging wheel 14 is rotatably mounted at each extremity of the axle housing 12 to support the latter.

An elongated, rectangular tilting frame 15 is mounted on the axle housing 12 at each side of and parallel to the tongue 10. The tilting frames 15 are identical and each comprises an elongated open frame formed from structural channels. The longitudinally extending side channels are mounted on shaft brackets 16 rotatably mounted on the axle housing 12. The brackets 16 can be longitudinally preset in any desired position along the axle housing by means of suitable set collars 17 and set screws 18. The position of the brackets 16 on the side channels is such that approximately ⅔ of the length of the tilting frames extends forwardly from the axle housing 12.

The forward extremities of the tilting frames 15 are suspended by means of vertical hangers 19 from a horizontal transversally extending cross beam 20 which is supported from the tongue by means of a hydraulically expandible supporting device. The hangers 19 are rigidly braced against horizontal sway by means of a cross channel member 21 and as illustrated the expandible supporting device comprises a hydraulic cylinder 22 pivoted on the tongue at 23 and actuating a hydraulic plunger 24 which is connected by means of bracket plates 25 to the cross beam 20.

Thus, it can be seen that if the hitch 13 be connected to a towing vehicle and the hydraulic cylinder 22 be connected to the hydraulic system of the vehicle, the tilting frames 15 can be tilted to any desired incline and if planters be mounted forwardly on the tilting frames, they will simultaneously and, in toto, move upwardly and downwardly.

The planting is accomplished by means of a conventionally V-shaped furrow-opening shoe 26 supported on plow beam members 27 which are adjustable in sleeves 28 rigidly mounted medially of the forward extremities of the tilting frames. Two furrow closing discs 29 follow each shoe to close the earth over the planted seed potatoes. The discs 29 are adjustably suspended from disc rods 30, there being one disc rod attached below the side member of each tilting frame on suitable hangers 31.

The seed potatoes to be planted are dumped upon inclined, trough-like tables 32 by an operator standing upon a floor 33 which extends over and between both tilting frames and provides a relatively large area for the hoppers and for the storage of sacks of seed potatoes. The seed potatoes are inspected and swept forwardly on the tables into feed boxes 34. The tables 32 and the boxes 34 are fixedly supported from the tilting frames upon suitable legs 35.

The seed potatoes can be transported from the boxes 34 to the shoes 26 by any of the conventional planter mechanisms. The latter mechanism, per se, forms no part of the present invention and a typical such mechanism will only be outlined here for descriptive purposes. For instance, conventional bucket chain feed mechanisms are indicated on the drawing consisting of a delivery trough 36 mounted on the front of each box 34 and extending downwardly into the shoe 26. An inverted conical feed hopper 37 extends downwardly from each box 34. An endless feed chain 38, provided with cups 39, extends about upper and lower chain sprockets 40 and 41, respectively, so that the cups will travel upwardly in the hopper 37 to elevate seed potatoes and drop them into the delivery trough 36. The descending cups in the trough 36 lower the potatoes and release them at a low elevation into the shoes 26.

The chains 38 can be driven in any suitable manner. As illustrated, each chain 38 is driven from a drive sprocket on one of the wheels 14 through the medium of a side transmission chain 42 each of which drives a countershaft 43, there being one countershaft journalled transversally beneath each tilting frame. Each countershaft carries a suitable sprocket 44 from each of which a suitable drive chain can be extended to drive the lower shaft 41 of the feed chain 38 of that frame or for driving any other type of seed feeding device as the seeder travels forwardly.

The advantages and uses of the improved seeder are believed to be apparent from the above description. Briefly, the entire assembly of seeding elements can be readily raised and lowered by simple actuation of a single supporting element without effecting the relationship between the individual elements of the assembly. Therefore, when the most efficient arrangement between the planting shoes, the feeding devices, the feed hoppers and the discs has been once attained, it need not be again disturbed to adapt the planter for various depths of planting or to adapt it for transport when not planting.

Since the feed mechanism, in this case the endless cupped chains 38, moves upwardly and downwardly simultaneously with the planting shoes 26, the feed mechanisms can be placed relatively close to the shoes so as to reduce the free drop of the seed potatoes to prevent bouncing and rolling.

For row spacing purposes the hangers 19 are attached to the cross beam 20 and the cross channel member 21 by means of removable bolts 46. The cross beam and the channel member are provided with a plurality of bolt holes 45 which enable the horizontal positions of the hangers to be changed by selection of the desired holes for the bolts 46.

The planter can be pre-adjusted for various row widths by loosening the set screws 18 in the bracket sleeves 17 and withdrawing the bolts 46 from the hangers 19. The tilting frames can then be moved toward or away from each other to space the shoes 26 at the desired row spacing. The set screws can then be retightened and the bolts reinserted and tightened in the proper holes 45 to pre-set the row spacing.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. Vehicle means for supporting two potato planters for vertical adjustment over two spaced plant rows comprising: a tongue for attachment to a towing vehicle; a wheel axle member mounted on the rear extremity of said tongue in T-shaped relation thereto; a ground-engaging wheel on each extremity of said wheel axle member; an elongated planter frame pivotally mounted on said axle member in the plane of and at each side of and parallel to said tongue, said planter frames being tiltable about their axle pivots below the plane of said tongue forwardly of said wheel axle member; a cross frame structure positioned above and transversally of said tongue; a suspension means extending downwardly from said cross frame structure at each side of said tongue and supporting the forward extremities of both of said planter frames from said cross frame structure independently of said tongue; and vertically adjustable supporting means supporting said cross frame structure from said tongue intermediate said suspension means for raising and lowering said cross frame relative to said tongue; one of said potato planters being independently mounted on each planter frame adjacent the forward extremity of the tongue and forwardly of said wheel axle member so that said planters will simultaneously arcuately raise and lower at each side of said tongue as a complete unit with said cross frame structure and said planter frames about the axis of said axle.

2. Vehicle means as described in claim 1 in which the vertically adjustable supporting means comprises a hydraulically expansible element pivotally connected between said tongue and said cross frame member medially between said two suspension means so that expansion of said element will simultaneously lift both planters.

3. Vehicle means as described in claim 2 having a seed potato receiving and feeding means mounted on each planter frame, said potato receiving and feeding means being positioned to feed seed potatoes to said planters.

4. Vehicle means as described in claim 3 having a floor fixedly mounted on and extending continuously over and between both said planter frames and over and above said tongue for carrying operating personnel, said floor tilting as a unit with said latter frames.

References Cited in the file of this patent

UNITED STATES PATENTS

| | | |
|---|---|---|
| 870,693 | Shirley | Nov. 12, 1907 |
| 947,538 | Barrow | Jan. 25, 1910 |
| 1,133,498 | Payne | Mar. 30, 1915 |
| 2,156,438 | Suverkrup | May 2, 1939 |

FOREIGN PATENTS

| | | |
|---|---|---|
| 370,658 | Germany | Mar. 5, 1923 |
| 850,082 | Germany | Sept. 22, 1952 |
| 415,600 | Great Britain | Aug. 30, 1934 |
| 561,479 | Great Britain | May 22, 1944 |